United States Patent [19]

Laval, Jr.

[11] 4,120,795

[45] Oct. 17, 1978

[54] DEVICE FOR SEPARATING A PLURAL PHASE FLUID SYSTEM INTO ITS CONSTITUENT PHASES

[76] Inventor: Claude C. Laval, Jr., 2444 N. Farris Ave., Fresno, Calif. 93705

[21] Appl. No.: 857,437

[22] Filed: Dec. 5, 1977

[51] Int. Cl.² .......................................... B01D 21/26
[52] U.S. Cl. ............................ 210/512 R; 55/459 R; 209/211
[58] Field of Search .................... 210/84, 304, 512 R, 210/512 M; 209/144, 211; 55/447, 453, 459 R

[56] References Cited

U.S. PATENT DOCUMENTS

| 2,967,618 | 1/1961 | Vane | 209/211 |
|---|---|---|---|
| 3,512,651 | 5/1970 | Laval, Jr. | 210/512 R |
| 3,529,724 | 9/1970 | Maciula et al. | 209/211 X |
| 3,568,837 | 3/1971 | Laval, Jr. | 210/304 X |
| 3,696,934 | 10/1972 | Oisi | 210/512 R |
| 3,776,385 | 12/1973 | Maciula et al. | 210/512 R X |

Primary Examiner—William A. Cuchlinski, Jr.
Attorney, Agent, or Firm—Huebner & Worrel

[57] ABSTRACT

A device for separating a plural phase fluid system into constituent phases having different specific gravities providing a vortexing chamber with a closed upper end, a lower end and a sidewall constituting a surface of revolution; a tubular vortex finder mounted concentrically in the upper end of the chamber having an upper end above the chamber and a lower end within the chamber, the sidewall having an inlet adjacent to the upper end for directing the fluid system tangentially into the chamber to swirl downwardly within the chamber for centrifugal separation of the heavier phase outwardly and downwardly while the lighter phase is discharged upwardly through the vortex finder; an auxiliary vortexing chamber concentrically downwardly extended within the vortexing chamber downwardly spaced from the vortex finder having a sidewall constituting a surface of revolution, a closed upper end, and an open lower end; and a tubular auxiliary vortex finder mounted concentrically in the upper end of the auxiliary chamber having an upper end opening upwardly through the upper end of the auxiliary vortexing chamber and an open lower end within the auxiliary vortexing chamber in downwardly spaced relation to the upper end thereof, the sidewall of the auxiliary vortex chamber having an inlet adjacent to the upper end thereof for directing fluid tangentially into the auxiliary vortexing chamber to swirl downwardly about the auxiliary vortex finder for further centrifugal separation of the residual heavier phase outwardly and downwardly within the chamber while the further cleaned lighter phase is discharged upwardly through the auxiliary vortex finder and then through the vortex finder.

19 Claims, 13 Drawing Figures

DEVICE FOR SEPARATING A PLURAL PHASE FLUID SYSTEM INTO ITS CONSTITUENT PHASES

BACKGROUND OF THE INVENTION

1. Field of the Invention

The present invention relates to a device for separation of a plural phase fluid system into its constituent phases, and more particularly to such a device in which the phases have different specific gravities and the separation is performed by swirling the fluid system through two centrifugal separators in fluid series relation for centrifugally impelling the heavier phase outwardly and downwardly while the lighter phase is discharged centrally and upwardly.

As employed herein, a "plural phase fluid system" means a system which is fluid and is made up of two or more constituent phases of different specific gravities. For example, it may be a light liquid in a heavy liquid, a gas in a liquid, a pulverulent solid in a liquid, etc.

2. Description of the Prior Art

The prior art is replace with a variety of separating devices for centrifuging separation of fluid phases having differing specific gravities. Such devices as a prime requirement must effectively separate the fluid phases so that an unwanted phase, such as silt or sand in water supply systems, is removed from the other, desired phase.

It is not enough, however, merely to perform such separation so that a high level of purity of the desired phase is achieved. It is also necessary that only a minimal amount of the desired phase is lost when the unwanted phase is discarded. Or in the instace of two wanted phases, their effective separation with a minimum waste of either is essential.

Furthermore, a device which performs effective separation but requires an excessive pressure drop for fluid flowing therethrough is highly undesirable. It wastes energy, frequently requires auxiliary pumping and is uneconomical to operate. It is especially difficult to achieve a fluid separator which combines effective separation with minimal pressure drop. Such a configuration is even more difficult to achieve when additional practical requirements are imposed. Such practical requirements commonly include relatively low initial cost, relatively low maintenance expense, and long life without attention.

SUMMARY OF THE INVENTION

It is therefore an object of the present invention to provide an improved device for separating a plural phase fluid system into its constituent phases.

Another object is to provide such a device in which the separation occurs by swirling the system so as to urge the heavier phase toward a quiescent settling chamber by fluid flow induced therefrom by the swirling movement.

Another object is to provide such a device for the highly effective separation of a heavier phase consisting of particulate matter, such as sand, in a liquid carrier, such as water.

Another object is to provide such a device in which highly effective separation is achieved with minimal pressure drop through the device.

Another device is to provide such a device suited for connection either to the inlet or to the outlet of a pump, and which can be submerged in the fluid system, as in a well, or can be located above ground.

Another object is to provide such a device which is resistant to clogging, minimizes internal abrasion by particulate matter, and has no requirement for frequent maintenance.

Another object is to combine two centrifugal separators in fluid series relation so as to attain more effective separation.

Further objects and advantages are to provide improved elements and arrangements thereof in a device for separation of a plural phase fluid system which is dependable, economical, durable, and fully effective in accomplishing its intended purpose.

DESCRIPTION OF THE PREFERRED EMBODIMENT

First Form

Figure 1:
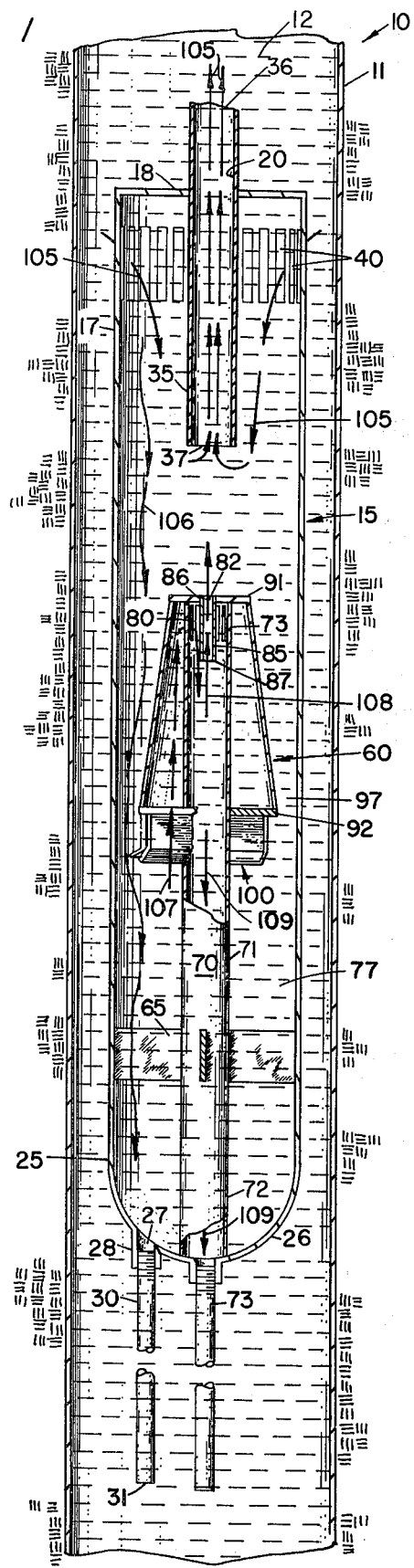
FIG. 1 is a vertical section of a separating device for a plural phase fluid system embodying a first form of the present invention, the device being shown as submerged within a well.

Referring more particularly to the drawings, a device of the first form of the present invention for separating a plural phase fluid system is indicated generally by the numeral 10 in FIG. 1. The device is disposed within a well casing 11 and is submerged in a two phase fluid system 12 consisting, for example, of sand and water. In any event, the two phases are differentiated by their specific gravities. The separating device 10 is particularly advantageous for separating the phases of such a system wherein one of the phases is particulate matter, such as sand or silt, and the other phase is a carrying fluid, such as water. However, the device can be employed for separation of fluid phases composed of other substances and even colloidal suspensions from a carrying liquid. It is to be understood that each phase does not have to be homogeneous, but either or both can be composed of a plurality of substances having specific gravities generally heavier or generally lighter than the other phase.

The separating device 10 has a cylindrical vortexing chamber 15 disposed with its axis substantially vertical. The chamber has a sidewall 16 which is illustrated as cylindrical but which may provide any desired inwardly disposed surface of revolution. The chamber has an upper end portion 17 upwardly closed by an end plate 18. The end plate 18 has an emitting passage 20 therethrough concentrically of the axis of the vortexing chamber.

The chamber 15 has a lower end portion 25 downwardly closed by an upwardly concave, fractionally spherical closure 26. The closure has a central discharge opening 27 circumscribed by a coupling 28. A discharge conduit or pipe 30 is connected to the coupling opening for communication with the lower end portion of the vortexing chamber. The conduit extends downwardly from the closure to an open discharge end 31 which is spaced a substantial distance below the vortexing chamber. As subsequently will be described, a separated, heavier phase of the two phase fluid system 12 is discharged through the opening 27 and conduit 30.

The separating device 10 has a unitary, elongated, cylindrically tubular vortex finder 25 mounted on the end plate 18 concentrically of the vortexing chamber 15 and extending upwardly and downwardly of the emitting passage 20. The vortex finder has a fluid outlet conduit 36 upwardly extended from the end plate 18. The vortex finder extends downwardly from the end plate to an open lower end 37 within the vortexing chamber. The outlet conduit is frequently connected to the inlet of a pump, not shown, for drawing a separated lighter fluid phase from the separating device and thereby inducing flow of the two phases into the device.

Figure 5:
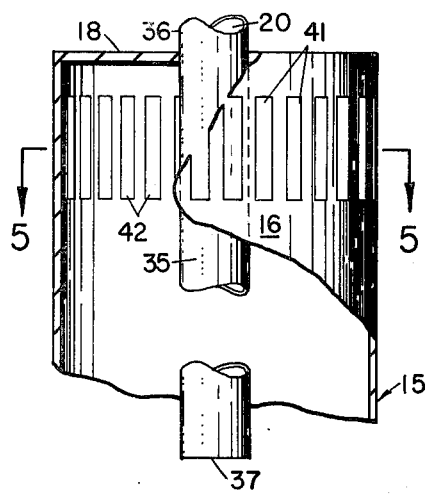
FIG. 5 is a horizontal section of the device taken at the position indicated by line 5—5 of FIG. 4.
Figure 5:
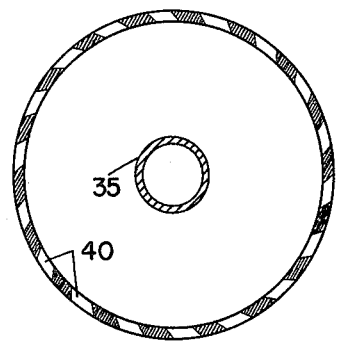
Figure 4:
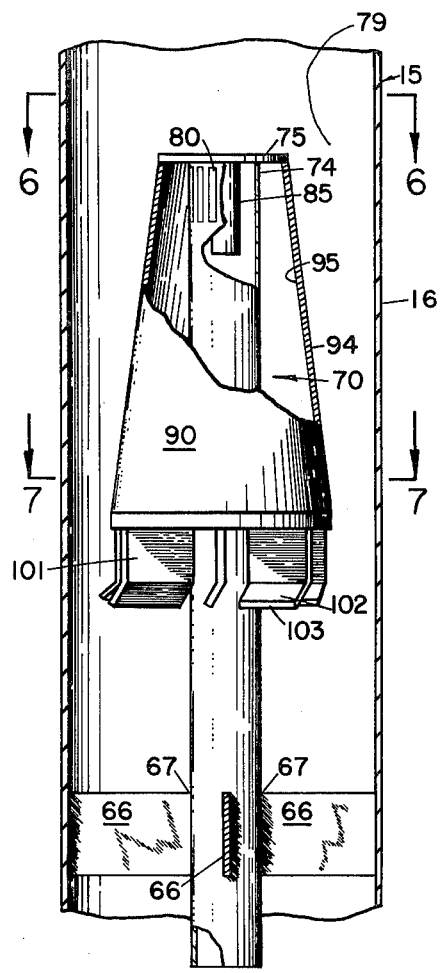
FIG. 4 is a fragmentary, vertical section at an enlarged scale of the separating device of FIG. 1 showing the upper end of the device and showing an auxiliary separating device with portions broken away for illustrative convenience.

The separating device 10 has a series of inlet slots 40, best shown in FIGS. 1, 4 and 5, cut through the sidewall 16 in the upper end portion 22 of the vortexing chamber 15. The slots are disposed in substantially equally spaced relation circumferentially of the chamber. Each slot extends axially of the chamber from an upper end 41 adjacent to the end plate 23 to a lower end 42 above the lower end of the vortex finder 35. As best shown in FIG. 5, each slot is cut through the sidewall in a plane tangential to a circle concentric of the vortexing chamber and having a diameter intermediate the diameters of the chamber and the vortex finder. A portion of a fluid system 12 enters the vortexing chamber through the slots and is caused thereby to swirl within the vortexing chamber. The fluid system can be urged into the slots by the head of fluid in the well casing 11 and/or by a negative pressure created by a pump connected to the emitting passage 20.

Figure 2:
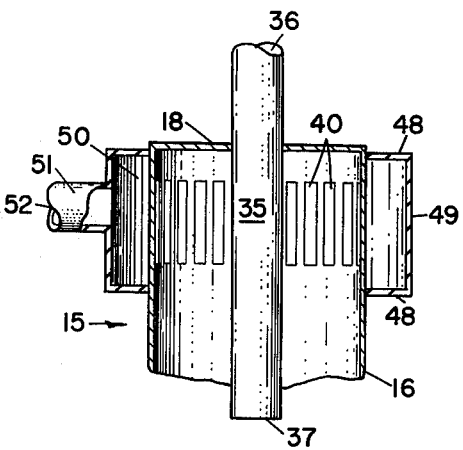
FIG. 2 is a fragmentary, vertical section of the upper end portion of a separating device, similar to that of FIG. 1 but for non-submerged use, as on the discharge side of a pump above ground.
Figure 3:
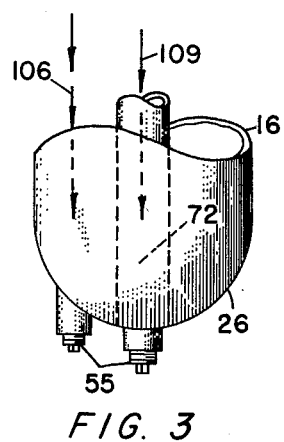
FIG. 3 is a fragmentary side elevation of the lower end portion of the device of FIG. 2.

As shown in FIGS. 2 and 3, the separating device 10 can be adapted for use above ground. A pair of planar rings 48 are, as shown in FIG. 2, mounted concentrically about the sidewall 16 above and below the slots. A cylindrical outer wall 49 extends concentrically and axially of the vortex chamber between the rings. The sidewall, outer wall, and rings define an annular inlet chamber or manifold 50 about the slots. An inlet conduit 51 communicates at one end with the inlet chamber and has an opposite end 52 connected to a source, such as a discharge connection of a pump, not shown, of a two phase fluid system substantially similar to the fluid system 12. A plug 55 can be fitted, as shown in FIG. 3, in the discharge outlet 27 of the vortexing chamber to prevent escape of fluid through the outlet. The plug can be removed to permit discharge of a separated phase of a fluid system, such as sand or silt removed from water.

The separating device 10 of the first form of the present invention has an auxiliary separating device, indicated generally by the numeral 60, disposed within the vortexing chamber 15 between the vortex finder 35 and the closure 26. The auxiliary separating device has a spider 65 mounted in the vortexing chamber within the lower end portion 25 thereof. The spider has a plurality of planar arms 66 fixed to the sidewall 16 and extending radially inwardly therefrom in equal angular relation. The arms have individual inner ends 67 disposed in a circle concentric with the vortex chamber.

Figure 7:
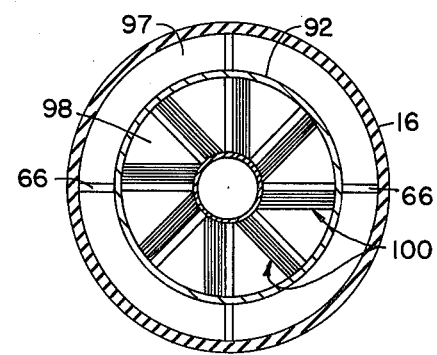
FIG. 7 is a horizontal section of the device taken at the position indicated by line 7—7 of FIG. 4.

The auxiliary separating device 60 is provided with an elongated auxiliary chamber 70 mounted on the inner ends 67 of the arms 66 of the spider 65. The auxiliary chamber has a sidewall 71 constituting a surface of revolution, preferably a cylinder as shown in FIGS. 1 and 7, concentric with the axis of the vortexing chamber 15. The auxiliary chamber has a lower end 72 extended through the closure 26 and connected to a pipe 73 extended down the well and through which sand or other heavy phase descends. The auxiliary chamber 70 has an upper end 74 which is enclosed within the vortexing chamber 15 in downwardly spaced relation to the lower end 37 of the vortex finder 35. A circular reflector plate 75, as best shown in FIG. 4, is mounted concentrically on and closes the upper end of the auxiliary vortexing chamber 70. The reflector plate extends transversely of the vortexing chamber 15 and has a diameter approximately one-third of the diameter of the vortexing chamber 15. A settling compartment 77 is defined by the reflector plate and the lower end portion 25 of the vortexing chamber 15. An annular opening 79 is defined between the periphery of the reflector plate and the sidewall 16 of the vortexing chamber 15 for passage of fluid past the plate to the settling compartment.

The reflector plate 75 is not necessary to the practice of the present invention, but assists in the separation of the two phases of the fluid system in a manner described in the applicant's U.S. Pat. No. 3,512,651 issued on May 19, 1970. It is, however, necessary that the upper end portion 73 of the auxiliary chamber 70 be closed in some manner, as by a plate corresponding to the end plate 18 of the vortexing chamber 15, having substantially the same diameter as the auxiliary chamber.

The auxiliary chamber 70 has a series of orifices or inlet slots 80 extending axially of the chamber and cut through the sidewall 71 thereof. The upper ends of the slots are adjacent to the reflector plate 75 and the slots extend downwardly a distance approximately the diameter of the auxiliary chamber. The slots 80 are circumferentially equally spaced about the auxiliary chamber, and are cut in planes tangential to a circle concentric of the auxiliary chamber. The slots function similarly to the slots 40 in the vortexing chamber and direct fluid entering the auxiliary chamber into a swirling movement therein.

The auxiliary separating device 60 has a circular opening or auxiliary passage 82 extending through the reflector plate 75 concentrically of the axis of the vortexing chamber 15. The auxiliary passage is juxtapositioned to lower end 37 of the vortex finder 35.

Figure 6:
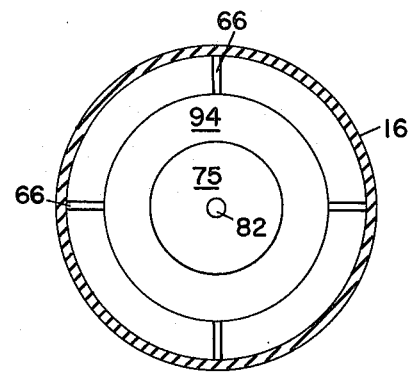
FIG. 6 is a horizontal section of the device taken at the position indicated by line 6—6 of FIG. 4.

The auxiliary separating device 60 has an elongated tubular auxiliary vortex finder 85 mounted on the reflector plate 75 concentrically of the auxiliary chamber 70. The auxiliary vortex finder has an upper end 86 fixed to and opening through the reflector plate, as shown in FIGS. 4 and 6. The upper end is connected to the reflector plate in registry with the auxiliary passage 82. The auxiliary vortex finder extends downwardly from the reflector plate to an open lower end 87 within the auxiliary chamber and downwardly spaced from the slots 80 therein.

The auxiliary separating device 60 preferably has a frusto-conical guide 90, best shown in FIG. 4, mounted on the auxiliary chamber 70 in housing relation to the slots 80 therein. The guide has a closed upper end 91 fitted to the reflector plate 75. The guide extends downwardly from the reflector plate in converging relation to the sidewall 16 to an open lower end 92. The lower end of the guide is of substantially larger diameter than the upper end thereof and is disposed axially of the auxiliary chamber approximately one-half of the distance between the spider 65 and the reflector plate. The guide has an outer surface 94 disposed toward the sidewall 16 and an opposite inner surface 95 disposed toward the auxiliary chamber 70. An outer annular passage 97, best shown in FIGS. 4, 6, and 7, is defined between the guide and the sidewall 16 of the vortexing chamber. An inner annular passage 98, best shown in FIGS. 4 and 7, is defined between the inner surface of the guide and the auxiliary chamber. The inner annular passage communicates upwardly with the slots 80 and downwardly with the settling compartment 77.

The auxiliary separating device 60 preferably has a plurality of vanes 100, best shown in FIGS. 4 and 7, mounted on the auxiliary chamber 70 and the lower end 92 of the frusto-conical guide 90 and downwardly disposed from the guide. The vanes have individual rectangular upper portions 101 individually disposed in planes radial to the axis of the vortexing chamber 15. The upper portions extend radially outwardly from the auxiliary chamber in equal angular relation. The upper edge of each of the upper portions of the vanes extends between and is fixed to the auxiliary chamber and to the lower end of the guide. Each vane has an angled rectangular planar lower portion 102 attached to the lower edge of the upper portion and extending radially from the auxiliary chamber. The lower portion of each vane extends downwardly from the upper portion and in angular relation thereto so that the lower edge 103 of the lower portion is disposed from the upper portion oppositely to the direction of fluid swirl induced by the slots 40 in the vortexing chamber 15.

The path of the bulk of a fluid system, disregarding any vortexing or swirling movement thereof, through the separating device is indicated by arrows 105. The downward portions of the arrows indicate a two phase system entering the device, while the upward portion depicts the path of the bulk of a separated lighter phase. Arrows 106 indicate the path of a separated heavier phase toward the discharge opening 27 therefor. Arrows 107 indicate the path of a mixture of the phases from the lower end portion 25 of the device into the auxiliary chamber 70. Arrows 108 indicate the path of portions of a lighter phase separated from said mixture while arrows 109 indicate the path of a heavier phase downwardly in the settling compartment 127.

Second Form

Figure 8:
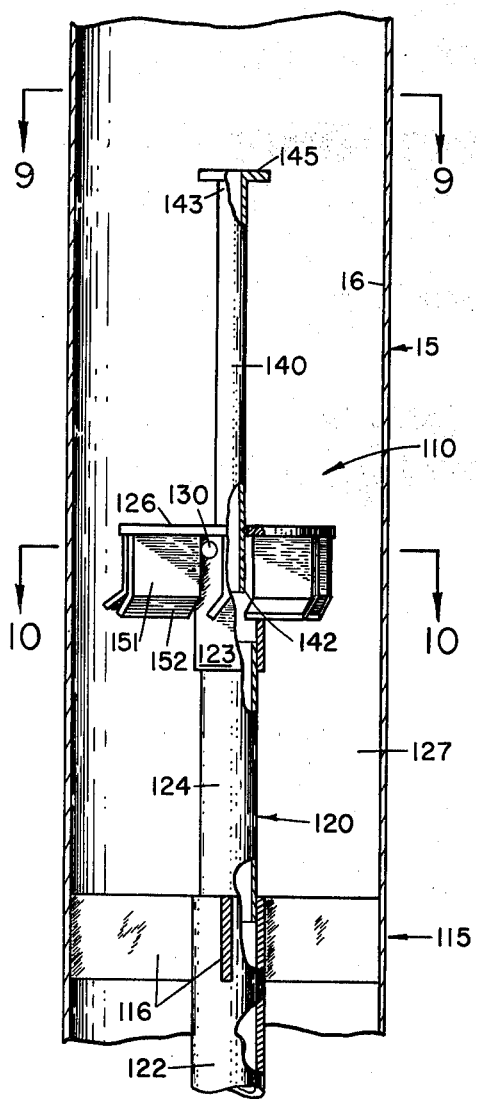
FIG. 8 is a fragmentary vertical section of a lower end portion of a separating device embodying a second form of the present invention showing a modified auxiliary separator corresponding to that shown in FIG. 4.
Figure 9:
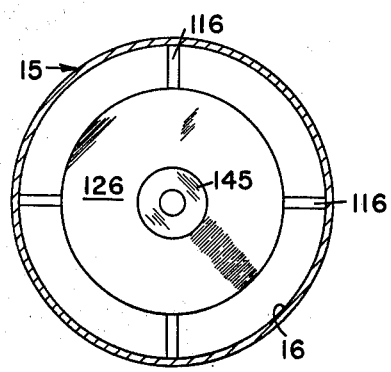
FIG. 9 is a horizontal section taken at the position indicated by line 9—9 of FIG. 8.
Figure 10:
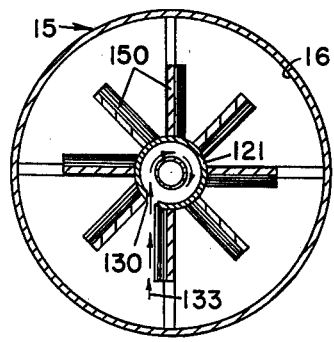
FIG. 10 is a horizontal section taken at the position indicated by line 10—10 of FIG. 8 showing a tangential orifice employed therewith.

A second form of the present invention is illustrated in FIGS. 8, 9, and 10. It is identical to the first form except a modified auxiliary separating device 110 is substituted for the auxiliary separating device 60 of the first form. The vortexing chamber 15 and the sidewall 16 thereof are fragmentarily represented in FIGS. 8, 9 and 10. It is to be understood that they have the same form and the same appurtenants as described in the first form. The auxiliary separating device of the second form is mounted within the vortexing chamber 15 by a spider 115, similar to the spider 65 of the first form, having arms 116 extending radially inwardly of the chamber.

The auxiliary device 110 has a cylindrical auxiliary chamber 120 mounted concentrically within the vortexing chamber 15 on the inner ends of the arms 116 of the spider 115. The chamber corresponds to the auxiliary chamber 70 of the first form of the invention. The chamber has a sidewall 121 which is cylindrical but can be of any desired surface of revolution. The chamber has a lower end portion 122 received in the spider which is extended through a closure 26 and connected to a pipe 73 extended downwardly in the well as described in the first form of the invention. The auxiliary chamber 120 has an upper end portion 123. The upper and lower end portions are interconnected by a cylindrical tube 124 fitted therein. Of course, the auxiliary chamber can be of unitary construction similar to the auxiliary chamber 70 utilized with the first form 60 of auxiliary separating device, if desired. The upper end portion is closed by a circular plate or disk 126 concentric with the vortexing chamber and approximately two-thirds the diameter of the inner surface 16 thereof. The disk, as shown in FIG. 9, has no opening therethrough except a central opening subsequently to be described. The disk, together with the portion of the vortexing chamber 15 therebelow, defines a settling chamber 127 corresponding to the settling chamber 77 of the first form of the present invention. The auxiliary chamber 120 is provided, as shown in FIGS. 8 and 10, with a bore or orifice 130 extending through the sidewall 121 thereof. The orifice is downwardly adjacent to the disk 128. The axis of the orifice is substantially horizontal and is tangential to a circle concentric with the auxiliary chamber and somewhat smaller in diameter. As indicated by the arrow 133 in FIG. 10, fluid entering the orifice is caused to swirl within the auxiliary chamber 120.

The auxiliary separating device 110 has an elongated tubular vortex finder 140, shown in FIG. 8, mounted on the disk 126 concentrically thereof and extending therethrough and vertically oppositely thereof. The tubular member has a downwardly open lower portion 142 extending from the disk within the auxiliary chamber 120. The tubular member extends upwardly from the disk to an upwardly open upper end 143. The upper end is juxtapositioned to the lower end of a vortex finder as shown at 35 in the first form. A circular reflector plate 145 is mounted on the upper end of the tubular member concentrically therewith with the upper end opening centrally of the reflector plate. The reflector plate corresponds in general to the reflector plate 75 of the first form of the invention.

The auxiliary separating device 110 has a plurality of vertical vanes 150, shown in FIGS. 8 and 10, mounted on the disk 126 and extended downwardly therefrom. The vanes are spaced in equal angular relation about the upper end portion 123 of the auxiliary chamber 120. The vanes correspond to the vanes 90 utilized with the first form of the present invention. Each vane has a planar upper portion 151 extending radially outwardly of the auxiliary chamber 120 substantially to the periphery of the disk 126. Planar lower portions 152 are mounted on the upper portions in oblique angular relation thereto. As previously described in connection with the vanes 100 of the first form of the invention, the lower portions are angled so as to oppose the swirling movement of fluid in the vortexing chamber 15.

Third Form

Figure 11:
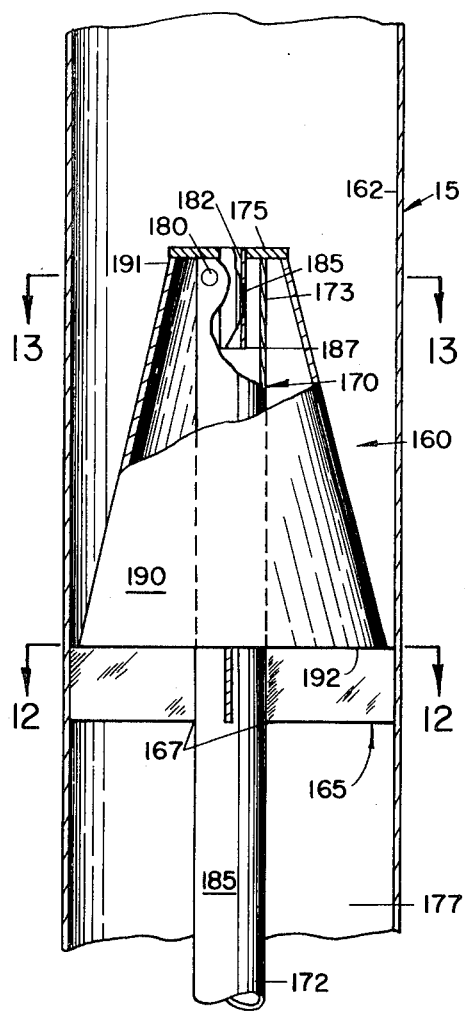
FIG. 11 is a fragmentary vertical section of the lower end portion of a separating device embodying a third form of the present invention. An auxiliary separator, corresponding to those of FIGS. 4 and 8, is shown with portions broken away to illustrate the interior.
Figure 12:
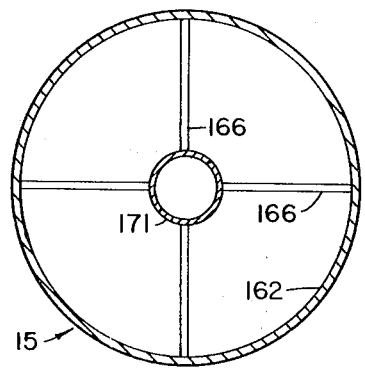
FIG. 12 is a horizontal section of the third form of the device taken at the position indicated by line 12—12 of FIG. 11.

The third form of the present invention is also identical to the first form except for structural differences in an auxiliary separating device 160, shown in FIGS. 11 and 12, which replaces the auxiliary separating device 60 of the first form. The auxiliary separating device 160 is contained within the vortexing chamber 15 having a sidewall which provides an inner surface 16 which is a surface of revolution, preferably cylindrical. The third form of the present invention also replaces the auxiliary separating device 60 with a modified auxiliary separating device but is otherwise identical thereto.

The auxiliary separating device 160 is mounted within the auxiliary vortexing chamber 15 by a spider 165 similar to the spiders 65 and 115, respectively, utilized with the first and second forms of the present invention. The spider has a plurality of arms 166 extending inwardly from the inner surface 162 of the vortexing chamber to inner ends 167. The auxiliary device has an elongated tubular auxiliary chamber 170 mounted on the inner ends of the arms of the spider. The chamber is similar to the auxiliary chambers 70 and 120, respectively, of the first and second forms of the present invention. The auxiliary chamber has a sidewall 171 which is a surface of revolution concentric of the axis of the vortexing chamber. The auxiliary chamber has a lower end 172 downwardly spaced from the spider which extends through the closure 26 in the manner of the auxiliary chambers 70 and 120. THe auxiliary chamber extends upwardly from the spider to an upper end portion 173 which is closed by a circular reflector plate 175 extending transversely of the vortexing chamber 15. The reflector plate corresponds to the reflector plate 75 utilized with the first form of the present invention, and, similarly, defines a settling compartment 177 downwardly thereof within the vortexing chamber.

A bore or orifice 180, corresponding to the orifice 130 of the second form, extends through the sidewall 171 of the auxiliary chamber 170 in downwardly adjacent relation to the reflector plate 175. The axis of the orifice is tangential to a circle concentric of the axis of the auxiliary chamber so as to induce a swirling motion within the chamber of fluid admitted through the orifice. The auxiliary chamber is provided with an opening 182 centrally through the reflector plate. A cylindrically tubular auxiliary vortex finder 185 is mounted on the reflector plate concentrically of the auxiliary chamber and in registry with the auxiliary passage. The auxiliary vortex finder extends downwardly from the reflector plate beyond the orifice 180 to a downwardly open lower end 187.

The auxiliary separating device 160 of the present invention has a frusto-conical guide 190 mounted on the auxiliary chamber 170 in housing relation to the orifice 180. The guide, which corresponds to the guide 90 of the first form has a constricted upper circular end fitted to the periphery of the reflector plate 175 and has an enlarged circular lower end 192 spaced downwardly therefrom. The lower end engages the spider 165 and is fixed thereto. The lower end of the frusto-conical guide is relatively larger in diameter relative to the sidewall 171 of the vortexing chamber 15 than is the lower end 92 of the guide 90 of the first form relative to the vortexing chamber 15.

It is to be understood that the forms of auxiliary separating devices 60, 110, and 160 as described provide superior arrangements of elements embodying the present invention. However, simplified configurations are superior to the prior art. For example, a configuration, perhaps best visualized from FIG. 8, can be employed which dispenses with the auxiliary chamber 120, disk 126, and vanes 150. Such a configuration utilizes only a reflector plate, corresponding to the reflector plate 145, and an elongated upwardly and downwardly open tubular member, corresponding to the member 140, extending downwardly from the plate to a supporting spider, similar to the spider 165. The upwardly open end of the tubular member is juxtapositioned to an emitting orifice, corresponding to the orifice 20 as shown in FIG. 1 toward which fluid is drawn upwardly through the member from a settling compartment corresponding to the compartment 77 as shown in FIG. 1.

OPERATION

The operation of the described embodiments of the present invention is believed to be clearly apparent and is briefly summarized at this point. Referring to FIG. 1, a two phase fluid system 12 typically consisting of water and sand, is caused to flow through the separating device 10 by a pressure differential applied between the tangential slots 40 and the emitting passage 20. Such a differential is typically created by connecting the upper end of the vortex finder 35 to the intake of a pump, not shown, and drawing the fluid in through the slots 40 while the device is immersed. If it is to be used above ground, the manifold 50 is employed and the inlet conduit 51 connected to the outlet of the pump. The fluid entering the slots is caused to swirl about the vortexing chamber 15 so that the sand is thrown outwardly by centrifugal force and descends downwardly as indicated by arrows 106. The bulk of the water, as indicated by arrows 105, moves downwardly and inwardly of the vortexing chamber 15 and is "reflected" from the plate 75. This reflection throws out remaining portions of the sand which continues downwardly. The bulk of the water then moves centrally and upwardly toward the lower end 37 of the vortex finder 35 and exits from the outlet end 36 of the vortex finder. As this far described, the operation is the same for all three forms of the present invention and as known in the prior art.

As some of the water bearing an increased amount of sand settles downwardly within the settling compartment 77 past the frusto-conical guide 70 of the first form of auxiliary separating device 60, the arms 66 of the spider 65 and the vanes 100 impede the swirling action thus minimizing the water's ability to carry the sand. The bulk of the sand descends toward the downward closure 26 of the vortexing chamber 15 where it settles out through the conduit 30.

The auxiliary passage 82 centrally of the reflector plate 75 is juxtapositioned to the lower end 37 of the vortex finder. As a result the fluid moving upwardly therethrough, as indicated by the arrows 105, induces a region of low pressure above the auxiliary passage relative to the pressure in the annular passage 97 outwardly of the frusto-conical guide 90. The partially cleansed water in the settling compartment, containing a substantially reduced portion of sand, is urged to flow upwardly through the vanes 100 and the slots 80 into the auxiliary chamber 70. The lower portions 102 of the vanes are angled, as previously described, downwardly and into the swirling fluid. As a result, said water and sand are guided upwardly and the swirling movement thereof is minimized by impact on the angled portions 102 and by guidance by the axially extending upper portions 101 of the vanes. Such elimination of turbulence permits additional sand to settle within the settling compartment. When the once cleansed fluid is drawn inwardly through the tangential slots 80, it swirls downwardly about the vortex finder 85 centrifuging further sand or other heavy material from the fluid. As shown by the arrows 107, 108, and 109, this action is similar to the action occurring upwardly in the vortexing chamber 15 about the vortex finder 35. The twice cleaned fluid moves inwardly and thence upwardly through the auxiliary vortex finder 85. Within the auxiliary chamber 70 the remaining sand is separated and settles downwardly through the pipe 73 and is returned to the well. The twice cleaned water or other fluid flows upwardly through the auxiliary vortex finder 85 to join the water which has been separated from sand upwardly in the vortexing chamber 15. The combined flows of separated water exit together from the separating device through the emitting passage 20 as indicated by the upwardly directed arrows 105.

As will be understood, the flow of water upwardly through the auxiliary passage 82 from the settling compartment 77 induces the separated sand, together with a portion of the water entering the separating device 10 to move downwardly through the outer annular passage 97 past the reflector plate 75 into the settling compartment. Such flow facilitates downward settling of the bulk of the sand within the settling compartment. After such settling, any sand remaining with the water which flows through the auxiliary passage is separated therefrom by the auxiliary separating device 60.

Sand, or other heavier component of a two phase fluid system such as 12, which is separated from the system descends downwardly in the settling compartment 77 past the spider 65 toward the discharge opening 27. If the conduit 30 and pipe 73 are removed and both resulting openings closed by plugs 55, as depicted in FIG. 3 for an above ground installation, the sand is gravitationally removed from time to time by removal of the plugs. When the conduit 30 and pipe 73 are employed, as in the submerged installation shown in FIG. 1, the separated sand, as soon as it is separated, settles downwardly therethrough. In such an installation, the lengths of the downwardly extending pipe and conduit can conveniently be made greater than the head of fluid equivalent to the pressure differential due to flow through the separating device. In this configuration, fluid from the well casing downwardly of the separating device cannot flow upwardly through the conduit and pipe into the settling compartment to disturb the settling sand or to introduce additional sand.

In the absence of some provision for flow of water or other separated lighter phase from settling compartment 77, the downward movement of the sand through the passage 97 is impeded. This occurs because there is no fluid flow to urge the sand out of the upper end portion 17 of the vortexing chamber into the relatively quiescent fluid in the settling compartment. As a result some sand is carried into the vortex finder 35. This difficulty is avoided by the auxiliary separating device 60 which induces flow of a limited quantity of water from the upper end portion 17 of the vortexing chamber into the settling chamber 77 by withdrawing a corresponding quantity of water from the settling chamber through the auxiliary chamber 70 and auxiliary passage 82. Such fluid does not carry sand from the settling chamber into the vortex finder due to the previously described centrifuging action of the auxiliary separating device. As a result more effective separation of the sand is obtained without appreciably increasing the overall pressure drop through the separating device 10. The overall pressure drop, relative to the prior art, is unaffected because the bulk of the fluid does not pass through the auxiliary separating device of the present invention, but passes through the prior art portion of the separating device.

The operation of the second form of auxiliary separator 110, shown in FIGS. 8, 9, and 10, is generally the same as that of the first form of auxiliary separator 60. The second form of auxiliary separator is disposed within the vortexing chamber 15 from which sand and a portion of the water entering the chamber descend with a swirling movement about the reflector plate 145 and disk 126. The swirling movement is counteracted by the vanes 150 to provide a quiescent volume of fluid within the settling chamber 77 from which the sand descends for discharge. A low pressure region is formed upwardly adjacent to the reflector plate which draws water from within the auxiliary vortex chamber 120 and beneath the disk 126. Such water is induced to flow through the tangential passage 130 as indicated by the arrow 133. Any sand carried by such water is separated therefrom by a centrifuging action within the auxiliary chamber 120 and descends downwardly therein. The water, after a flow reversal about the lower portion 142 of the elongated vortex finder 140, similar to that described in connection with the vortex finder 85 of the first form of the invention, is drawn upwardly within the vortex finder and exits centrally of the reflecting plate 145. The second form of auxiliary separator 110 permits the reflector plate 145 to be spaced upwardly of the auxiliary separator proper in contrast to the first and third forms of auxiliary separators 60 and 160.

Figure 13:
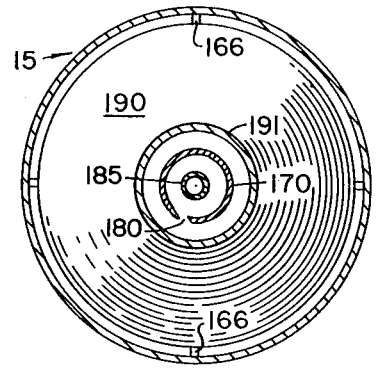
FIG. 13 is a horizontal section of the third form of the device taken at the position indicated by line 13—13 of FIG. 11.

The operation of the third form of auxiliary separator 160, shown in FIGS. 11, 12 and 13, is generally similar to that of the first form 60 of the present invention. The third form, however, is not provided with vanes corresponding to the vanes 100 and 150 of the other two forms. The swirling fluid motion for centrifuging separation within the auxiliary chamber 170 is obtained by fluid flow through the tangential orifice 180 corresponding to the orifice 130 of the second form of auxiliary separator 110. The lower end 192 of the frusto-conical guide 190 and the inner surface 162 of the vortexing chamber 161 are relatively more closely spaced than the corresponding elements of the first form. Therefore, sand descending outwardly of the guide is further removed from the upward flow of water induced toward the lower end 187 of the auxiliary vortex finder 185 than is the corresponding flow of water in the first form of the present invention. Any swirling action upwardly within the conical guide is reduced by the arms 166 of the spider 165 in a manner corresponding to the action of the vanes of the other two forms.

The separating devices of the present invention achieve a much more complete separation of components having different specific gravities from a plural phase fluid system than previously considered possible by such means. This is attained in part by combining two centrifugal separators in fluid series in a common centrifuging chamber and enabling the second to separate a lighter phase from a heavier phase contained in the system from which the first separator previously has separated portions of the heavier phase. The superior results are attained without any significant increase in pressure drop across the device. It is simple to construct, economical, durable, has no moving parts, and fully effective in achieving fluid separation on the basis of distinctions in specific gravities.

Although the invention has been herein shown and described in what are conceived to be the most practical and preferred embodiments, it is recognized that departures may be made therefrom within the scope of the invention, which is not to be limited to the illustrative details disclosed.

Having described my invention, what I claim as new and desire to secure by Letters Patent is:

1. A device for separating a fluid system containing at least two phases having different specific gravities comprising:
   (A) a vortexing chamber having upper and lower end portions and a sidewall having an inwardly disposed surface of revolution concentric to a longitudinal axis for the chamber, said upper end portion having an emitting passage concentrically therethrough;
   (B) means for supplying such a fluid system into the upper end portion of the vortexing chamber tangentially to said axis so that the fluid swirls downwardly in the chamber to centrifuge portions of the heavier phase outwardly for descent in the chamber to the lower end portion thereof and said fluid then swirls upwardly through the emitting passage; and
   (C) a plate mounted transversely of said axis concentrically of the chamber and with the lower end portion of the chamber defining a settling compartment, said plate having an opening therepast adjacent to said sidewall to admit the fluid containing the centrifuged portions of said heavier phase to the compartment, and said plate having an auxiliary passage therethrough concentrically of said axis juxtapositioned to the emitting passage whereby the fluid swirling upwardly to and through said passage draws fluid from the settling compartment through the auxiliary passage to reduce the pressure in the settling compartment and facilitate settling of the heavier phase therein.

2. The device of claim 1 having a frusto-conical guide providing a constricted end connected to the plate concentrically of the auxiliary passage and an open enlarged lower end, said guide having an outer surface which with the sidewall of the chamber defines an annular downwardly constricted passage circumscribing the guide.

3. The device of claim 2 having a substantially cylindrical auxiliary chamber having an upper end portion connected to the plate concentrically of the auxiliary passage and an open opposite end portion downwardly extended concentrically of the guide, and an elongated tubular vortex finder connected to the plate in registry with said auxiliary passage and downwardly extended concentrically of the auxiliary chamber, the upper end of the auxiliary chamber having an orifice therethrough tangential to a circle concentric to the vortex finder whereby fluid is drawn in through the orifice to swirl downwardly about the auxiliary vortex finder to centrifuge the heavier phase therefrom and thence upwardly through the vortex finder for discharge with the fluid swirling upwardly through said emitting passage.

4. The device of claim 1 having an elongated tubular member connected to the plate in registry with said auxiliary passage and downwardly extended therefrom and having an open lower end to admit fluid for passage out of the auxiliary passage.

5. A device for separating a fluid system containing at least two phases having different specific gravities comprising:
   (A) a vortexing chamber having upper and lower end portions and a sidewall having an inwardly disposed surface of revolution concentric to a longitudinal axis for the chamber;
   (B) an elongated tubular vortex finder concentric to said axis having a lower end within the chamber and an upper end out of the chamber;
   (C) means for supplying such a fluid system to the upper end portion of the chamber directed so that the fluid swirls downwardly about the vortex finder to centrifuge the heavier phase outwardly for descent in the chamber and to draw the lighter phase inwardly beneath the vortex finder and thence outwardly through the vortex finder;
   (D) an elongated auxiliary chamber mounted in the chamber concentrically of said axis and in downwardly spaced relation to the vortex finder, said auxiliary chamber having a closed upper end and an open lower end within the vortexing chamber; and
   (E) an elongated tubular auxiliary vortex finder mounted concentrically of said axis in the upper end of the auxiliary chamber, opening upwardly therethrough in juxtaposition to the lower end portion of the vortex finder, and having an open lower end within the auxiliary chamber, the upper end of the auxiliary chamber having an orifice tangential to the axis through which fluid is drawn to swirl downwardly about the auxiliary vortex finder further to centrifuge the heavier phase therefrom and thence upwardly through the auxiliary vortex finder and with the lighter phase outwardly through the vortex finder.

6. The device of claim 5 including vanes disposed between the auxiliary chamber and the sidewall to minimize swirling of the fluid therebetween.

7. The device of claim 5 in which the lower end portion of the vortexing chamber is closed, and including means for removing the heavier phase from said lower end portion of the vortexing chamber.

8. The device of claim 7 adapted for submerged usage in which the means for removing the heavier phase from the lower end of the vortexing chamber comprises a conduit connected to said lower end of the chamber for gravitational descent of the heavier phase therethrough and downwardly extended therefrom a distance sufficient to prevent influx of fluid therethrough.

9. The device of claim 5 including a planar vortex reflector plate mounted concentrically on the upper end of the auxiliary chamber with the auxiliary vortex finder opening therethrough.

10. The device of claim 5 including a frusto-conical guide mounted concentrically about the auxiliary chamber in housing relation to the orifice in the upper end portion thereof having an outer surface which with the sidewall of the chamber defines an annular downwardly constricted passage circumscribing the guide and having an inner surface which with the auxiliary chamber defines an annular upwardly constricted passage circumscribing the auxiliary chamber and communicating with the orifice in the upper end portion of the auxiliary chamber.

11. The device of claim 10 in which the reflector plate is circular and including a frusto-conical guide mounted concentrically about the auxiliary chamber having a constricted upper end connected to the reflector plate and an open enlarged lower end, the guide having an outer surface which with the sidewall of the chamber defines an annular downwardly constricted passage circumscribing the guide and an inner surface which with the auxiliary chamber defines an annular upwardly constricted passage circumscribing the auxiliary chamber.

12. A device for separating two phases of a fluid system on the basis of their relative specific gravities comprising:
(A) a vortexing chamber having a lower end portion, a closed upper end portion, and a sidewall constituting a surface of revolution concentrically about a longitudinal axis for the chamber;
(B) an elongated tubular vortex finder mounted concentrically in the upper end portion of the chamber, open upwardly therethrough and extended coaxially downwardly therein;
(C) means for directing such a fluid system into the vortexing chamber tangentially to a circle concentric to the axis of the chamber above the lower end of the vortex finder whereby the fluid swirls downwardly in the chamber centrifugally impelling the heavier phase outwardly for descent to the lower end portion of the chamber while the lighter phase is impelled inwardly below the vortex finder and thence upwardly and inwardly for discharge through the vortex finder;
(D) an auxiliary chamber having a closed upper end portion, an open lower end portion, and a sidewall constituting a surface of revolution concentrically of the axis of the chamber, the upper end portion of the auxiliary chamber being in downwardly spaced relation to the lower end of the vortex finder and aligned therewith;
(E) an elongated tubular auxiliary vortex finder mounted concentrically in the upper end portion of the auxiliary chamber, open upwardly therethrough, and extended coaxially downwardly therein, the auxiliary chamber having an opening in the upper end portion thereof tangential to a circle concentric to the axis whereby a portion of the lighter constituents of the heavier phase are drawn inwardly through said opening, swirl downwardly in the auxiliary chamber centrifugally impelling the relatively heavier constituents therein outwardly for descent in the auxiliary chamber while the relatively lighter constituents swirl inwardly and upwardly for discharge through the auxiliary vortex finder and thence discharge out of the vortex finder.

13. The device of claim 12 including vanes disposed between the auxiliary chamber and the sidewall to minimize swirling of the fluid therebetween.

14. The device of claim 12 in which the lower end portion of the vortexing chamber is closed, and including means for removing the heavier phase from said lower end portion of the vortexing chamber.

15. The device of claim 14 adapted for submerged usage in which the means for removing the heavier phase from the lower end of the vortexing chamber comprises a pipe connected to said lower end of the chamber for gravitational descent of the heavier phase therethrough and downwardly extended therefrom a distance sufficient to prevent influx of fluid therethrough.

16. The device of claim 12 including a planar vortex reflector plate mounted concentrically on the upper end of the auxiliary chamber with the auxiliary vortex finder opening therethrough.

17. The device of claim 16 in which the reflector plate is circular and including a frusto-conical guide mounted concentrically about the auxiliary chamber having a constricted upper end fitted to the reflector plate and an open enlarged lower end, the guide having an outer surface which with the sidewall of the chamber defines an annular downwardly constricted passage circumscribing the guide and an inner surface which with the auxiliary chamber defines an annular upwardly constricted passage circumscribing the auxiliary chamber.

18. The device of claim 12 including a frusto-conical guide mounted concentrically about the auxiliary chamber in housing relation to the opening in the upper end portion thereof having an outer surface which with the sidewall of the chamber defines an annular downwardly constricted passage circumscribing the guide and having an inner surface which with the auxiliary chamber defines an annular upwardly constricted passage circumscribing the auxiliary chamber and communicating with the opening in the upper end portion of the auxiliary chamber.

19. A device for separating solid particles, such as sand and silt, from a carrying fluid, such as water, comprising:
(A) a vortexing chamber having upper and lower end portions and a sidewall constituting a surface of revolution concentrically about a longitudinal axis for the chamber, the upper end portion of the chamber being closed;
(B) an elongated tubular vortex finder mounted concentrically in the upper end portion of the chamber, opening upwardly therethrough, and extended coaxially downwardly therein;
(C) means for directing the water carrying the solid particles into the vortexing chamber tangentially to a circle concentric to the axis of the chamber above the lower end of the vortex finder whereby the fluid swirls downwardly in the chamber along the vortex finder centrifugally impelling the solid particles outwardly for descent to the lower end portion of the chamber while the water is impelled inwardly and thence inwardly and upwardly for discharge through the vortex finder;

(D) an auxiliary chamber having upper and lower end portions and a sidewall constituting a surface of revolution concentrically of the axis of the chamber, the upper end portion of the auxiliary chamber being closed, being in downwardly spaced relation to the lower end of the vortex finder and being aligned therewith;

(E) an elongated tubular auxiliary vortex finder mounted concentrically in the upper end portion of the auxiliary chamber opening upwardly therethrough, and extended coaxially downwardly therein, the auxiliary chamber having a laterally disposed opening in the upper end portion thereof tangential to a circle concentric to the axis whereby water containing residual quantities of solid particles is drawn inwardly through said opening, swirls downwardly in the auxiliary chamber along the auxiliary vortex finder centrifugally impelling the residual solid particles outwardly for descent in the auxiliary chamber while the further cleansed water swirls inwardly and upwardly for discharge through the auxiliary vortex finder and thence discharge out of the vortex finder.

* * * * *

UNITED STATES PATENT AND TRADEMARK OFFICE
CERTIFICATE OF CORRECTION

PATENT NO. : 4,120,795
DATED : October 17, 1978
INVENTOR(S) : Claude C. Laval, Jr.

It is certified that error appears in the above–identified patent and that said Letters Patent are hereby corrected as shown below:

Column 1, line 34, delete "instace" and substitute ---instance---.

Column 3, line 36, delete "25" and substitute ---35---.

Signed and Sealed this

Sixth Day of February 1979

[SEAL]

Attest:

RUTH C. MASON
Attesting Officer

DONALD W. BANNER
Commissioner of Patents and Trademarks